Figure 1:
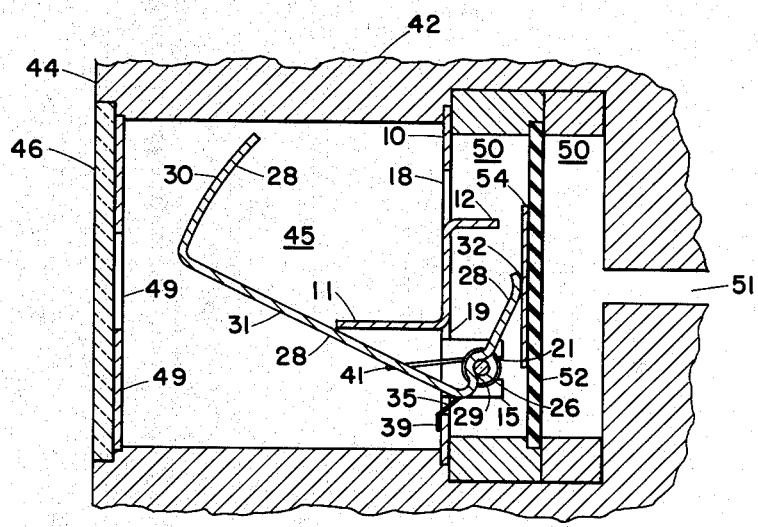

Dec. 7, 1965 V. E. JOHANNSEN 3,221,704
FLUID FLOW APPARATUS
Filed April 24, 1964

INVENTOR.
VERNON E. JOHANNSEN
BY
*Roger W Nolan Jr*
ATTORNEY

United States Patent Office 3,221,704
Patented Dec. 7, 1965

3,221,704
FLUID FLOW APPARATUS
Vernon E. Johannsen, Wilton Junction, Iowa, assignor to The Bendix Corporation, Davenport, Iowa, a corporation of Delaware
Filed Apr. 24, 1964, Ser. No. 362,239
2 Claims. (Cl. 116—117)

This invention relates to fluid flow apparatus and more particularly to an improved gas flow responsive and indicating apparatus which has especially advantageous application in an oxygen regulator.

In the oxygen regulator art, devices for sensing and indicating oxygen flow are referred to as blinker gauges. This type of gauge has universal application for the purpose of flow indication, but will be described herein as utilized in oxygen regulators, however, the gauge of the present invention should not be considered to be limited thereto in that many applications of the improved gauge are envisioned.

An object of the present invention is to provide an improved blinker gauge.

Another object of the present invention is to provide an improved oxygen blinker gauge designed for use in an oxygen regulator.

The present invention is an improvement over the invention described in United States Patent No. 2,505,118 issued April 25, 1950, to Bradford B. Holmes and assigned to the assignee of the present invention. Blinker gauges of this design have proven satisfactory for many applications, but with the modern high performance and reliability requirements, gauges of this design have failed performance requirements because of excessive wear at the load bearing points. In addition, blinker gauges of this design are necessarily bulky and heavy (1 ounce by weight).

As heretofore mentioned, fluid flow apparatus of the present invention may advantageously be used as blinker gauges in oxygen regulators. Regulators of the demand type are disclosed in United States Patents Number 2,627,866 issued on February 10, 1953, to Bradford B. Holmes, and Number 2,967,536 issued on January 10, 1961, to Urban F. Stratman, both patents assigned to the assignee of the present invention, wherein the user will draw air through the venturi-injector of the regulator and not be aware when he is not being supplied with oxygen. Blinker gauges of the type of the present invention may be disposed in fluid communication with the flow passage behind the injector nozzle of such regulators, thereby providing the user with an indication of oxygen flow. The blinker gauges must not respond to pressures below a minimum value because exhalation into a mask connected to the regulator will cause a pressure build-up behind the injector. Therefore, gauges of present designs have been complicated, bulky, and have required numerous parts.

A further object of the present invention is to provide an improved blinker gauge for an oxygen regulator having a minimum number of parts, small size, and having a weight of ¼ of an ounce.

A still further object of the present invention is to provide a highly reliable blinker gauge for an oxygen regulator having a structural design which substantially eliminates component wear at the load bearing points during continuous performance of several million cycles.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and description and is not to be construed as defining the limits of the invention.

Figures 2, 3:
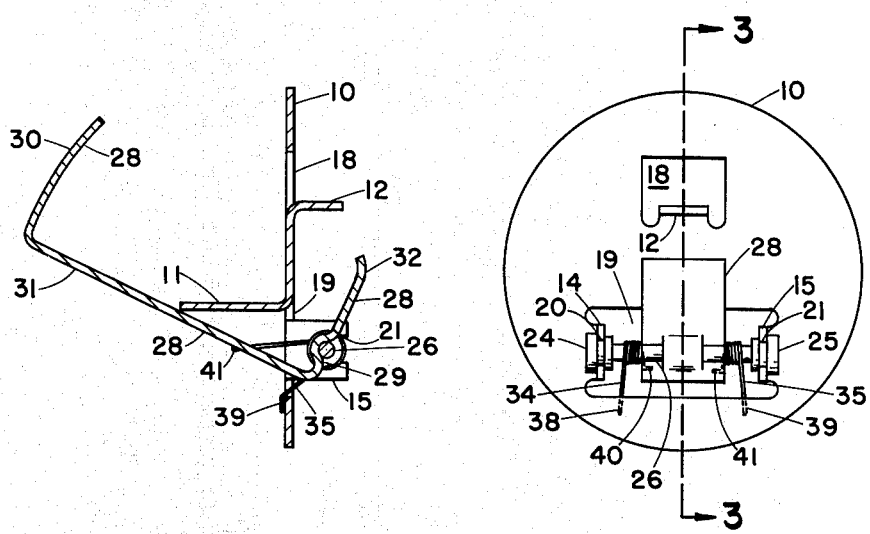

In the drawing:
FIGURE 1 is a schematic drawing of the blinker gauge of the invention as utilized in an oxygen regulator;
FIGURE 2 is a front elevation view of the novel fluid flow apparatus of the present invention; and
FIGURE 3 is a sectional view taken through the vertical center line of the novel fluid flow apparatus shown in FIGURE 2.

Referring first to FIGURES 2 and 3, there is shown the fluid flow apparatus, hereinafter referred to as a blinker mechanism, having a frame member 10 which may be in the form of a disk. An advantageous construction of the blinker gauge may have blinker stop 11, actuator stop 12 and supports 14 and 15 stamped from disk 10, thereby providing apertures 18 and 19 therethrough. Stops 11 and 12 and supports 14 and 15 extend outwardly and substantially perpendicular from the disk 10. Supports 14 and 15 (or yoke) have their outward ends forming slots 20 and 21.

Bushings 24 and 25 are mounted on shaft 26 and disposed for rocking movement in slots 20 and 21, respectively, of supports 14 and 15. The indicator or blinker is generally designated by the numeral 28 and is secured to the shaft 26 by means of press fitting the shaft 26 into slot 29 of the blinker 28. One end of blinker 28 is desirably divided into two color contrasting sections 30 and 31 so that the change in color is manifested during the rocking or reciprocating motion of the blinker 28. The second end of blinker 28 includes an actuating surface 32 disposed to receive a suitable actuating means. Torsion springs 34 and 35 are coiled on shaft 26 and disposed between blinker 28 and bushings 24 and 25, respectively. The first free ends 38 and 39 of each torsion spring 34 and 35, respectively, are disposed through aperture 19 and are biased against the under side of plate 10. The second free ends 40 and 41 of each torsion spring 34 and 35, respectively, are disposed through the aperture 19 and are biased against the underside of blinker 28 thereby biasing the blinker 28 against the blinker stop 11. It can be readily seen that springs 34 and 35 may be of a single construction having first free ends 38 and 39 or second free ends 40 and 41 joined together.

Referring now to FIGURE 1, there is shown the blinker mechanism of FIGURES 2 and 3 as it would be utilized in an oxygen regulator. The blinker mechanism is shown slightly more than twice its actual size as used in commercial practice and in an oxygen regulator as thus employed is approximately one-quarter (¼) of an ounce by weight. In FIGURE 1 there is shown an oxygen regulator housing 42 having a face portion 44 visible by the user. Housing 42 defines a blinker chamber 45 having a first open end at the face portion 44 of the housing 42. Cover glass 46 encloses the open end of the blinker chamber 45 and has plate 48 with an oval-shaped opening 49 therethrough.

Disposed in chamber 45 is the blinker mechanism shown in FIGURES 2 and 3 having disk 10 disposed at the second end of the chamber 45 whereby blinker 28 is visible through the oval-shaped opening 49.

Disk 10 and housing 42 define a diaphragm chamber 50 having a passageway 51 opening thereinto, said passageway in fluid communication with the oxygen supply of the regulator, preferably immediately upstream of the venturi-injector of the regulator. A pressure responsive member or advantageously a diaphragm 52 as shown is disposed across the interior of diaphragm chamber intermediate and substantially parallel to disk 10 separating and sealing said passageway 51 from said disk 10. Plate 54 is fixed to diaphragm 52 for point contact with actuating surface 32 of blinker 28. The travel of diaphragm 52 is limited by the contact of plate 54 with stop 12.

In operation of the blinker mechanism when utilized in oxygen regulation, a portion of which is shown in FIGURE 1, oxygen flowing to the user will also pass through passageway 51 into chamber 50 thereby urging diaphragm 52 against the tension of springs 34 and 35. Movement of diaphragm 52, and thus plate 54 which is in contact actuating surface 32, pivots blinker 28 around shaft 26 until plate 54 contacts top 12, thereby driving contrasting section 30 of blinker 28 and exposing it to view through oval-shaped opening 49 and glass 46. On exhaling oxygen by the user, the demand valve of the oxygen regulator is closed so that oxygen flows to the user and thus no oxygen will pass into passageway 51, the tension of the springs 34 and 35 will urge blinker 28 back against stop 11, thereby again exposing to view contrasting section 31 of blinker 28 through oval-shaped opening 49 and glass 46. Therefore, the rocking or reciprocating motion of blinker 28 relative to and behind oval-shaped opening 49 present to view the contrasting sections 30 and 31 thereby giving a visual indication of flow and no-flow conditions of oxygen to the user. In such an operation, friction in the mechanism is substantially eliminated because of the small contact area between actuating surface 32 and plate 54, the large bearing area between supports 14 and 15 and bushings 24 and 25 respectively and the advantageous employment of stop 12 which reduces the load on bushings 24 and 25.

While the blinker mechanism as shown in the drawing is of the construction shown and described, it is understood that the instant invention is not limited to any particular form or construction. Moreover, other changes and modifications of the novel blinker mechanism contemplated herein may be made by those skilled in the art without departing from the scope of the instant invention.

I claim:
1. An oxygen flow responsive apparatus for indicating an oxygen flow condition comprising
  (a) a housing defining an oxygen inlet and an opening disposed at the front of said housing,
  (b) pressure responsive means movably mounted in said housing having one side thereof exposed to and actuated by the flow of oxygen through said inlet,
  (c) a frame member having an aperture therethrough and interposed between said pressure responsive means and said opening,
  (d) a shaft,
  (e) a pair of supports extending from said frame member having means for supporting said shaft,
  (f) an indicating member in the form of a single structure mounted for rocking motion on said shaft, said indicating member extending through said aperture having one end of two sections of contrasting colors and viewable through said opening and a second end arranged to be actuated by the movement of said pressure responsive means,
  (g) a stop extending from said frame member,
  (h) torsion spring means disposed around said shaft having a portion thereof resting against said indicating member for biasing said indicating member against said stop, thereby exposing one of said sections of contrasting color to view through said opening.
2. In an oxygen regulator a blinker gage for indicating the presence or absence of oxygen flow through the regulator comprising
  (a) a housing,
  (b) a blinker chamber defined by said housing having an open end and an oxygen inlet,
  (c) a cover glass disposed across the open end of said housing,
  (d) a shield within said chamber disposed behind said cover glass and having an opening therethrough,
  (e) a movable resilient diaphragm disposed across the interior of said blinker chamber having one side thereof exposed to and actuated by the flow of oxygen from said oxygen inlet,
  (f) a disk member disposed across the interior of said chamber substantially parallel to said resilient diaphragm,
  (g) a pair of substantially parallel supports extending substantially perpendicular from said disk and formed therefrom having slots formed at their outer ends,
  (h) a stop extending from said disk and formed therefrom,
  (i) an aperture through said disk formed by said supports and said stop,
  (j) a diaphragm stop extending from said disk toward said diaphragm and formed from said disk,
  (k) a shaft disposed in said slots for rocking movement therein,
  (l) a blinker member in the form of a single structure extending through said aperture having one end of two sections of contrasting color and viewable through said opening in said shield to give a warning signal and a second end arranged to be actuated by the movement of said diaphragm,
  (m) torsion spring means disposed around said shaft between said blinker and each of said pair of supports having a portion thereof resting against said member for biasing said member against said stop thereby exposing one of said sections of contrasting colors to view through said opening in said shield.

References Cited by the Examiner

UNITED STATES PATENTS

| | | | |
|---|---|---|---|
| 2,052,720 | 9/1936 | MacLean et al. | 73—407 |
| 2,179,808 | 11/1939 | Berg | 116—114.26 |
| 2,198,888 | 4/1940 | Snyder | 116—65 |
| 2,325,415 | 7/1943 | McKinley | 116—117 |
| 2,505,118 | 4/1950 | Holmes | 116—117 |
| 2,627,866 | 2/1953 | Holmes | 137—64 |
| 2,952,265 | 9/1960 | Isaacson | 137—64 |
| 2,967,536 | 1/1961 | Stratman | 137—63 |
| 3,129,722 | 4/1964 | Wagner | 137—557 |

FOREIGN PATENTS 188,443  11/1922  Great Britain.

LOUIS J. CAPOZI, *Primary Examiner.*